United States Patent
Maloney et al.

(10) Patent No.: US 12,539,077 B1
(45) Date of Patent: Feb. 3, 2026

(54) APPARATUS AND METHOD FOR USING A PORTABLE THERMAL DEVICE TO QUANTIFY PAIN PERCEPTION

(71) Applicant: WR Medical Electronics Co., Maplewood, MN (US)

(72) Inventors: Kyle A. Maloney, Stillwater, MN (US); E. Paul Maloney, Stillwater, MN (US); Christian M. Darling, Minneapolis, MN (US)

(73) Assignee: WR Medical Electronics Co., Maplewood, MN (US)

( * ) Notice: Subject to any disclaimer, the term of this patent is extended or adjusted under 35 U.S.C. 154(b) by 788 days.

(21) Appl. No.: 17/886,653

(22) Filed: Aug. 12, 2022

Related U.S. Application Data

(60) Provisional application No. 63/233,081, filed on Aug. 13, 2021.

(51) Int. Cl.
  *A61B 5/00* (2006.01)
  *A61B 5/26* (2021.01)

(52) U.S. Cl.
  CPC ............... *A61B 5/483* (2013.01); *A61B 5/26* (2021.01); *A61B 5/742* (2013.01); *A61B 2560/0214* (2013.01)

(58) Field of Classification Search
  CPC ........... A61B 5/483; A61B 5/26; A61B 5/742; A61B 2560/0214
  See application file for complete search history.

(56) References Cited

U.S. PATENT DOCUMENTS

| | | | |
|---|---|---|---|
| 5,191,896 A | 3/1993 | Gafni et al. | |
| 6,724,791 B1* | 4/2004 | Chiappetta | H01S 5/02415 372/36 |
| 6,741,895 B1 | 5/2004 | Gafni et al. | |
| 8,083,786 B2 | 12/2011 | Gafni et al. | |
| 8,652,189 B2 | 2/2014 | Gafni et al. | |
| 2004/0243021 A1* | 12/2004 | Murphy | A61B 5/4893 600/549 |
| 2012/0065713 A1* | 3/2012 | Greaves | A61F 7/007 607/96 |
| 2014/0219701 A1* | 8/2014 | Eberlein | A45D 34/041 401/2 |
| 2015/0127077 A1 | 5/2015 | Ben Asher et al. | |
| 2017/0035339 A1* | 2/2017 | Faubert | A61B 5/123 |
| 2020/0008973 A1 | 1/2020 | Dunbar et al. | |

OTHER PUBLICATIONS

Y. Abudllah et al., "Analysis of the Copper and Aluminum Heat Sinks Addition to the Performance of Photovoltaic Panels with CFD Modelling," 2020 1st International Conference on Information Technology, Advanced Mechanical and Electrical Engineering (ICITAMEE), Yogyakarta, Indonesia, 2020, pp. 41-45 (Year: 2020).*
Hooten et al., "Associations between Heat Pain Perception and Pain Severity among Patients with Chronic Pain," Pain Medicine, vol. 11, 2010, pp. 1554-1563.
"Case IV: Computer Aided Sensory Evaluator—Instructions for Use," WR Medical Electronics Co., Jul. 9, 2020, 20 pages.

* cited by examiner

*Primary Examiner* — Eric F Winakur
*Assistant Examiner* — Hy Khanh Doan
(74) *Attorney, Agent, or Firm* — Fredrikson & Byron, P.A.

(57) ABSTRACT

A portable heat stimulation device that can generate a heat stimulus and deliver the heat stimulus to a patient in a manner that may be useful in quantifying the patient's perception of pain.

38 Claims, 7 Drawing Sheets

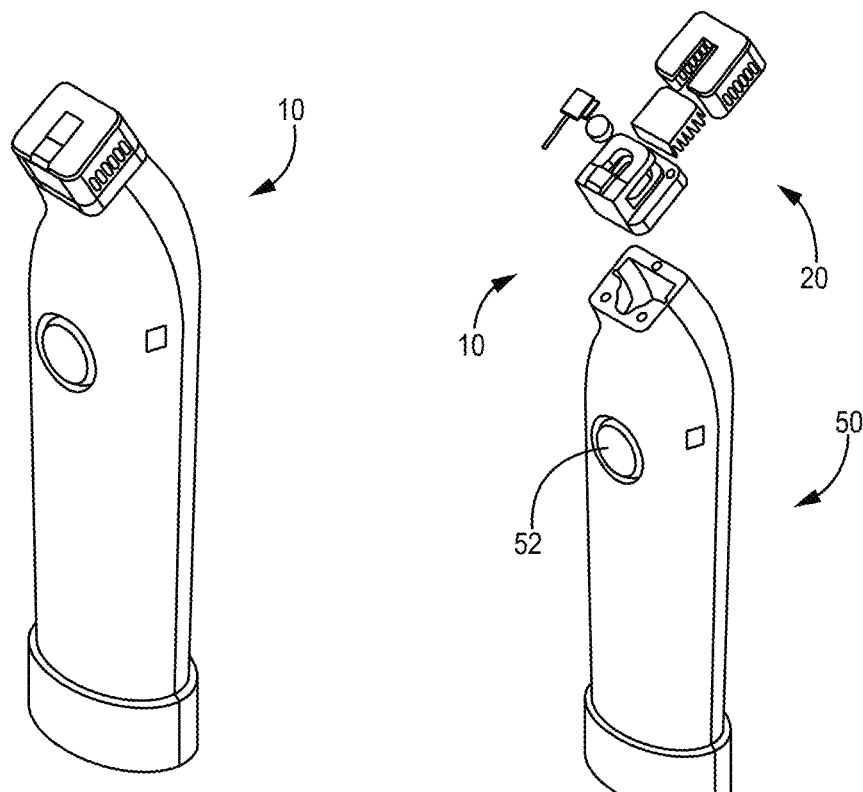
FIG. 1A
FIG. 1B
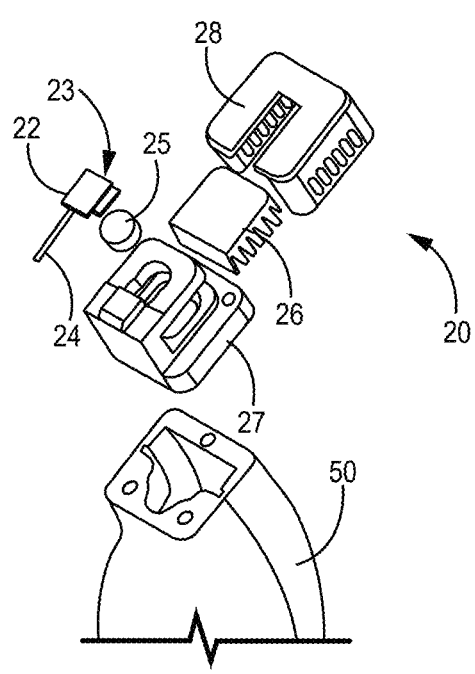
FIG. 1C

APPARATUS AND METHOD FOR USING A PORTABLE THERMAL DEVICE TO QUANTIFY PAIN PERCEPTION

RELATED APPLICATIONS

This application claims priority to U.S. Provisional Patent Application No. 63/233,081, filed Aug. 13, 2021, the entire contents of which are incorporated herein by reference.

TECHNICAL FIELD

This disclosure relates generally to devices and/or methods for assessing the level of pain experienced by a patient.

BACKGROUND

In clinical settings, it may be desirable to assess and/or quantify a patient's perception of pain. Existing techniques may be subjective or may give a vague, inaccurate, or non-reproducible measure of pain. For example, a pin prick may be used to assess pain and peripheral sensation in a patient, and a subjective quantification of the pain/sensation may be obtained in such a manner. Other techniques may be large or cumbersome to use, and may require significant amounts of electrical power, for example. It would be preferable to have a portable device that can be used to quickly assess and/or quantify a patient's perception of pain.

U.S. Published Patent Application No. 2020/0008973A1, entitled "APPARATUS AND METHOD FOR USING A PORTABLE THERMAL DEVICE TO REDUCE ACCOMMODATION OF NERVE RECEPTORS," the contents of which are incorporated by reference in relevant part, describes a portable heating device for delivering a therapeutic dose of heat to the skin to relieve pain, reduce accommodation of thermal nerve receptors, promote healing, and deliver transcutaneous medications.

SUMMARY

In general, this disclosure is directed to an apparatus and method that may be useful in assessing and/or quantifying a patient's perception of pain. In certain embodiments, the apparatus may be a relatively small (e.g., portable), battery-powered, heat stimulation device. In one exemplary configuration, a portable heat stimulation device is described herein that can generate a heat stimulus (or thermal stimulus) and deliver the heat stimulus to a patient in a manner that may be useful in assessing and/or quantifying the patient's perception of pain.

In certain embodiments, a stimulation waveform may be helpful in delivering the desired heat stimulus and/or yielding the desired quantification of patient pain perception. In certain embodiments, a stimulation waveform may be helpful in delivering a desired heat stimulation while also enabling the device to be small/portable and/or battery-powered. In some embodiments, the stimulation waveform comprises a controlled increase and controlled decrease in temperature applied at a surface of the patient's skin, and the temperature may be controlled by use of a thermoelectric unit ("TEU") applied to the patient surface or a suitable nearby surface. In some embodiments, the TEU may be controlled to deliver the thermal stimulus based on a sensed temperature signal provided by a temperature sensor, such as a thermocouple or thermistor, for example. The stimulation waveform may, for example, comprise a relatively sharp increase and subsequent sharp decrease in temperature to approximate or simulate the pain of a pin prick, which can be used to assess and/or quantify a patient's perception of pain.

In some examples of a heat stimulation device according to this disclosure, the temperature sensing or measurement that is used to control the temperature (and therefore, the heat stimulus delivered) at the patient surface/interface side may be a temperature measured at an "opposite" side (e.g., a non-patient side) from the side of the thermoelectric unit ("TEU") positioned in contact with the patient surface/interface. For example, a temperature sensor, such as a thermocouple or thermistor, may be positioned to sense a temperature of the non-patient side of the TEU, and use this signal to control the temperature of the patient-facing side of the TEU during delivery of the thermal stimulus.

In certain embodiments of a heat stimulation device according to this disclosure, the heat stimulation device is configured to be powered by a rechargeable battery. Similarly, in some exemplary embodiments, the heat stimulation device may be a hand-held device. Optionally, the heat stimulation device may be adapted to communicate with other devices wirelessly, for example, via Bluetooth communications.

In certain embodiments, an "H-Bridge" control circuit may be employed to control the temperature profile of the stimulation waveform. An H-Bridge is an electronic circuit that enables the rapid application of a voltage to a load in either direction (e.g., reversing polarity rapidly across a load in a circuit). The use of an H-Bridge controller in some embodiments of a heat stimulation device may enable better control of the stimulation waveform, for example, enabling a more "spiked" temperature waveform signal than would be accomplished using other known methods of controlling the temperature profile (e.g., the thermal stimulus) administered by the TEU.

In some embodiments, a heat sink is placed in thermal contact with the TEU to transfer heat to and from the TEU. A heat sink according to certain embodiments of this disclosure may facilitate control of the temperatures of the heat sink and/or the TEU without using the flow of a cooling fluid (e.g., circulating water flow or forced air from fans) to provide the needed level of heat transfer, for example, as might be found in much larger devices. A heat sink may comprise a first material in thermal contact with the TEU, and a second material in thermal contact with the other side of the first material, the first and second materials having different thermal conductivities. The second material may further include a plurality of fins (e.g., cooling fins) to further enable heat transfer to static air around the heat sink without requiring the flow of a cooling fluid (e.g., circulating water flow or forced air from fans) or other comparable, bulky cooling apparatus to accomplish the desired level of heat transfer.

A number of safety controls may be employed in certain embodiments of a heat stimulation device to ensure that a patient will not be harmed (e.g., burned) during use. As one example, an upper temperature limit, if reached, may cause an immediate reversal in polarity of the signal to the TEU to begin immediate cooling. Another example of a safety feature or control includes the use of a "watchdog timer" to monitor and ensure that the control circuitry is continuing to function properly; upon detection of an error condition, such a feature could take immediate steps to remove the thermal stimulus, or begin cooling, etc. A user-interface for a heat stimulation device according to this disclosure may also employ one or more data checks, for example, to ensure that programmed inputs make sense, and/or that data returned falls within logical ranges, etc., and returning an error message to a user in the event of an out-of-range or erroneous condition (e.g., rather than returning an illogical value, for example).

In some embodiments, a self-check or self-monitoring function may be employed to analyze for the presence of "hot spots" that may pose a risk of harm if left undetected. For example, a diagnostic test could be performed where the device looks for a temperature difference or "spread" across the heat stimulation surface that exceeds a predetermined threshold level. This type of diagnostic self-test could take place at any time, or upon initiation by a user, or it may be setup to automatically run during recharging of the device in a docking station, for example. An alert or alarm may be used to indicate a potential failure or hazard to a user based on the results of such tests.

In some embodiments, software controls may be employed to ensure that a medically valid test protocol is performed.

An exemplary heat stimulation device in accordance with this disclosure may use (and may possibly store) normative data values to provide comparisons to results obtained with a patient. For example, in some embodiments, normative values based on a patient's age, gender, and/or other factors may provide a set of data to compare test results to. By way of example and not limitation, a normative value corresponding to a level of pain for a 36-year-old male receiving a particular thermal stimulus or heat stimulation level might be a perceived "6" on a scale of 1 to 10 (or possibly a range of values, such as 5-7 out of 10), and patients of the same gender and similar age would be expected to provide a similar perception of pain (or within a corresponding range) in response to that particular heat stimulation level. Assessments could be made quickly based on such comparisons to normative data, for example. A patient's perception of pain that falls outside of an expected normal range may be indicative of a problem warranting further testing, for example.

In certain embodiments of the invention, a specific stimulus waveform and/or method of delivery or application of that waveform may be useful for quantification of a patient's perception of pain.

The details of one or more examples are set forth in the accompanying drawings and the description below. Other features, objects, and advantages will be apparent from the description and drawings, and from the claims.

BRIEF DESCRIPTION OF DRAWINGS

FIGS. 1A-1C are perspective views (including an exploded view and an enlarged exploded view) of a heat stimulation device in accordance with an exemplary embodiment of this disclosure;

DETAILED DESCRIPTION

Figure 4A:
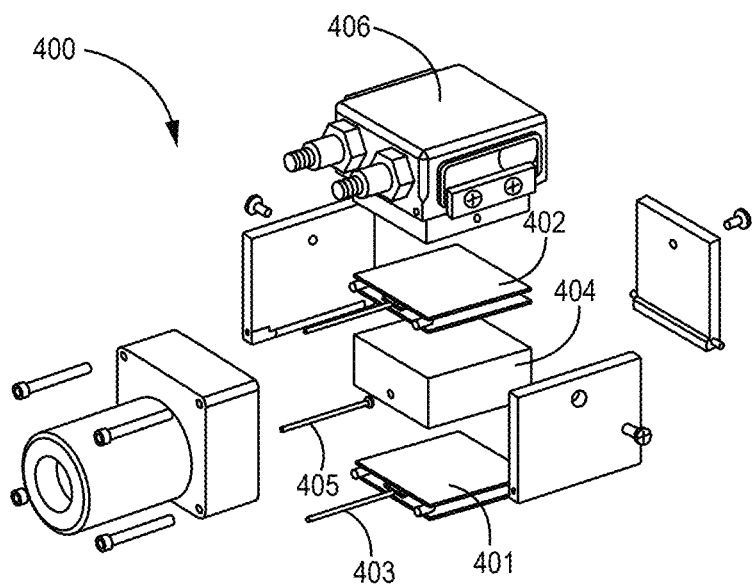
FIGS. 4A and 4B are exploded and unexploded perspective views, respectively, of a heat stimulation device.
Figure 4B:
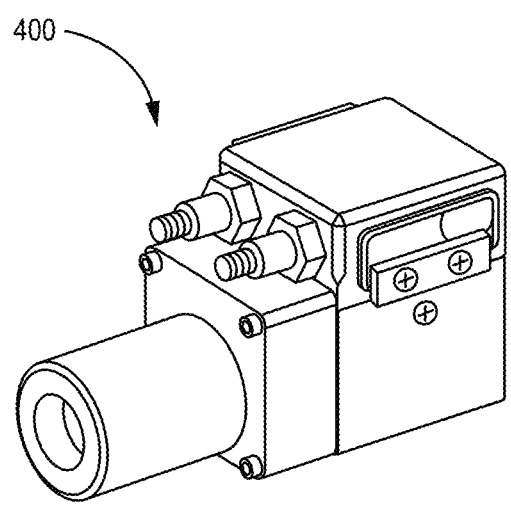

By way of background, FIGS. 4A and 4B are perspective views (exploded view and unexploded view, respectively) of a heat stimulation device 400 that may be used for assessing and/or quantifying pain perception by patients. The instructions for use ("IFU") for such a device 400 are provided in the document, "Computer Aided Sensory Evaluator from WR Medical Electronics, P/N 5027, dated Jul. 9, 2020. The device described in this IFU document includes most of the components shown with reference to FIG. 4A. For example, in the device shown in FIG. 4A, there are two thermoelectric units ("TEUs"), surface TEU 401 and cooling TEU 402.

The TEUs 401 and 402 of device 400 operate according to the thermoelectric effect (a.k.a., the "Peltier" effect). Each TEU comprises an arrangement of semiconductor P-N junctions which, in response to the application of a direct current electrical signal, cause one side or surface of the TEU to become warmer while the other side or surface of the TEU becomes cooler.

Other elements of the device 400 shown in FIGS. 4A and 4B include an aluminum block 404 positioned between the TEUs 401 and 402; thermocouple wires 403 coupled to TEU 401, thermistor 405 coupled to aluminum block 404, and water cooling assembly 406 positioned adjacent to cooling TEU 402.

The aluminum block 404 and water cooling assembly 406 both function to control the temperature of the materials in contact with the non-patient facing side of surface TEU 401 (e.g., the side of TEU 401 in contact with a surface of aluminum block 404). Controlling the temperature of the non-patient facing side of the surface TEU 401 may enable accurate (relatively precise) control of the thermal stimulus or heat stimulus (e.g., the temperature profile vs. time, duration of applied temperature, etc.) delivered at the patient-facing side of the surface TEU 401.

Figure 1D:
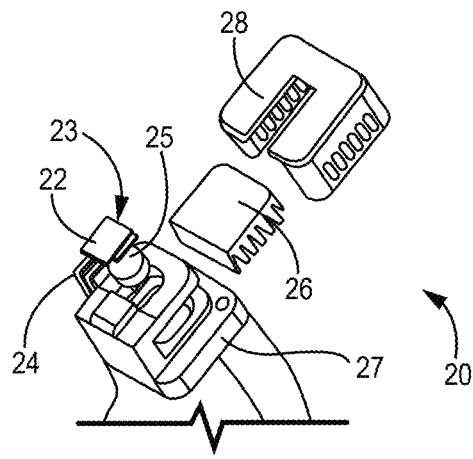
FIGS. 1D-1E are enlarged perspective views of a stimulus portion of a heat stimulation device (exploded), and a thermoelectric unit ("TEU") and a temperature sensor, respectively, according to embodiments of this disclosure.

FIGS. 1A-1C are perspective views of a heat stimulation device 10 in accordance with an embodiment of this disclosure. FIG. 1A shows heat stimulation device 10 in an assembled configuration as it would appear when ready for use. FIGS. 1B and 1C include an exploded view and an enlarged exploded view, respectively, of a stimulus portion 20 of a heat stimulation device 10 in accordance with an embodiment of this disclosure. Also shown in FIGS. 1B and 1C is housing portion 50 coupled to stimulus portion 20, housing portion 50 being sized and configured to be held in a user's hand in this example. FIG. 1B also shows an optional user input device 52 disposed on housing portion 50.

In some embodiments, hand-held device 10 is further configured to receive an input corresponding to a response of the patient to the thermal stimulus. For example, user input device 52 may be pressed to record the time at which the patient responds to a certain thermal stimulus, as well as recording information about the particular thermal stimulus itself. In some embodiments, the input corresponding to the response of the patient to the thermal stimulus may be provided by the patient (i.e., rather than by an operator of the device 10) via a separate device configured to communicate wirelessly with the hand-held device 10 and/or a docking station (to be discussed in more detail below). In some embodiments, the housing portion 50 of device 10 may further comprise a display (not shown) for displaying a result relating to the patient's perception of pain.

Certain elements previously described above with respect to the device of FIGS. 4A and 4B have been removed or replaced with alternative elements in the apparatus of FIGS. 1A-1C. For example, in FIG. 1C, TEU 22, temperature sensor 23, such as a thermocouple or thermistor (disposed on the opposite or "bottom" side of TEU 22), and temperature sensor wires 24 (e.g., thermocouple wires 24) are shown, which are similar to surface TEU 401 and thermocouple wires 403 of FIG. 4A. TEU 22 comprises a first side and a second side, wherein the first side of TEU 22 is configured to be placed in proximity to (and/or in contact with) the skin surface of the patient in order to deliver the thermal stimulus. TEU 22 is further configured to receive an electrical current signal, which may result in varying the temperature of the first side and/or the second side of TEU 22.

In some embodiments, TEU 22 is a "Peltier effect" TEU that operates according to the Peltier effect such that an electrical current signal of a given direction or polarity applied to TEU 22 will cause the temperature of the first side of the TEU to vary in one direction (e.g., to increase), while causing the temperature of the second side of the TEU to vary in the opposite way (e.g., to decrease); reversing the direction of the electrical current signal through TEU 22 would have the opposite effect on the temperatures of the first and second sides of TEU 22. For example, TEU 22 may be configured to increase the temperature of the first side of the TEU 22 and decrease a temperature of the second side of the TEU 22 in response to receiving an electrical current signal having a first polarity or direction through the TEU 22, and wherein the TEU 22 is configured to decrease the temperature of the first side of the TEU 22 and increase the temperature of the second side of the TEU 22 in response to receiving an electrical current signal having a second polarity or direction opposite to the first polarity or direction.

In some embodiments, temperature sensor 23 (e.g., a thermocouple or thermistor), may be disposed in proximity to either the first side or the second side of TEU 22 to sense a temperature thereof and to generate a sensed temperature signal based thereon. In some embodiments, a thermocouple 23 is used and is disposed in proximity to the second side of TEU 22 to sense a temperature of the second side of TEU 22 and to generate a sensed temperature signal based thereon. In some embodiments, using a sensed temperature signal taken from the second side of TEU 22 may provide a feedback control input for controlling the temperature at the first side of TEU 22 used to apply the thermal stimulus to the skin of a patient, for example.

The stimulus portion 20 of the device shown in FIG. 1C is configured to deliver a thermal stimulus to a skin surface of a patient during operation to assess the patient's perception of pain. The stimulus portion 20 of the device in FIG. 1C may differ from the device 400 of FIGS. 4A and 4B in that, in addition to TEU 22, stimulus portion 20 comprises a heat sink comprising two materials, a first material 25 and a second material 26, arranged as shown and configured to be thermally coupled to each other and to TEU 22 in a thermally conductive manner. This may be accomplished, for example, by placing adjacent surfaces of these elements in contact with each other. For example, a first side of the first material 25 may be positioned in thermal contact with the second side of TEU 22, and a second side of the first material 25 is positioned in thermal contact with a first side of the second material 26. In some embodiments, the second material 26 may have a second side comprising a plurality of cooling fins. In some embodiments of this disclosure, the first material 25 has a different coefficient of thermal conductivity than the second material 26. Throughout the remainder of this disclosure, the heat sink will be described with reference to an exemplary embodiment in which the first material comprises copper forming a copper heat sink 25, and the second material comprises aluminum forming an aluminum heat sink 26. In some embodiments, copper heat sink 25 has a first side and a second side, and the first side of the copper heat sink 25 is placed in thermal contact with the second side of TEU 22. In some embodiments, aluminum heat sink 26 has a first side and a second side, and the first side of the aluminum heat sink 26 is placed in thermal contact with the second side of copper heat sink 25. In some further embodiments, the aluminum heat sink 26 may comprise a plurality of cooling fins extending from the second side of aluminum heat sink 26, as shown in FIG. 1C.

The arrangement of TEU 22, copper heat sink 25, and aluminum heat sink 26 in this manner was found to have thermal conduction characteristics that may help (possibly in conjunction with other aspects of this disclosure) to enable device 10 to deliver a number of defined thermal stimuli to a patient to assess the patient's perception of pain, while doing so in a small device (e.g., hand-held, portable, battery-operated, etc.). This may be attributable to the thermal conduction characteristics of the first material (e.g., the copper heat sink) to provide even, efficient heat transfer from the second side of TEU 22, followed by the thermal conduction characteristics of the second material (e.g., the aluminum heat sink), and/or the arrangement of the associated cooling fins to enable rapid heat dissipation. Similarly, the arrangement of TEU 22, copper heat sink 25, and aluminum heat sink 26 (e.g., with cooling fins) in this manner was found to have thermal conduction characteristics that may help enable device 10 to facilitate control of the temperatures of the heat sink 25, 26 and/or the TEU 22 without using a flow of a cooling fluid (e.g., circulating water flow or forced air from fans) to provide an appropriate level of heat transfer, for example, as one might find in a much larger device.

In the device shown in FIGS. 1B and 1C, copper heat sink 25 and aluminum heat sink 26 may serve to accomplish a function similar to that of certain elements of the device of FIGS. 4A and 4B, such as the aluminum block 404, water cooling assembly 406, and cooling TEU 402 shown in FIG. 4A. For example, copper heat sink 25 and aluminum heat sink 26 may help achieve and/or maintain the temperature of the second side (e.g., the non-patient facing side) of TEU 22 at some predetermined value or range, or to follow a predefined temperature profile as a function of time, for example, without using a flow of a cooling fluid (e.g., circulating water flow or forced air from fans) to provide an appropriate level of heat transfer, for example. This effect may be enhanced in some embodiments by the incorporation of cooling fins in aluminum heat sink 26. In some embodiments, the above-mentioned substitution of elements may enable a significant reduction in the overall size of the heat stimulation device 10 of FIGS. 1A-1C as compared to the device of FIGS. 4A and 4B. In some embodiments, this substitution of elements may result in a reduction in the amount of electrical power required to operate the heat stimulation device 10 of FIGS. 1A-1C.

In some embodiments, a stimulation waveform may be generated by the heat stimulation device 10 of FIGS. 1A-1C and delivered by the stimulus portion 20 of device 10 to a skin surface of a patient to assess the patient's perception of pain. As an example of a stimulation waveform that may be employed, reference is made to FIG. 3, which shows a thermal stimulus waveform or stimulation waveform 60 plotted as temperature as a function of time. As shown, the thermal stimulus waveform 60 may comprise a temperature signal that rises from a baseline temperature 62 (e.g., corresponding to a temperature of 34 degrees C. in FIG. 3), with a mostly linear increase to a peak temperature 64 (e.g., corresponding to a temperature of approximately 49 degrees C. in the example shown in FIG. 3). These temperature values are exemplary only, and other values for baseline temperature 62 and/or peak temperature 64 may be chosen.

Figure 3:
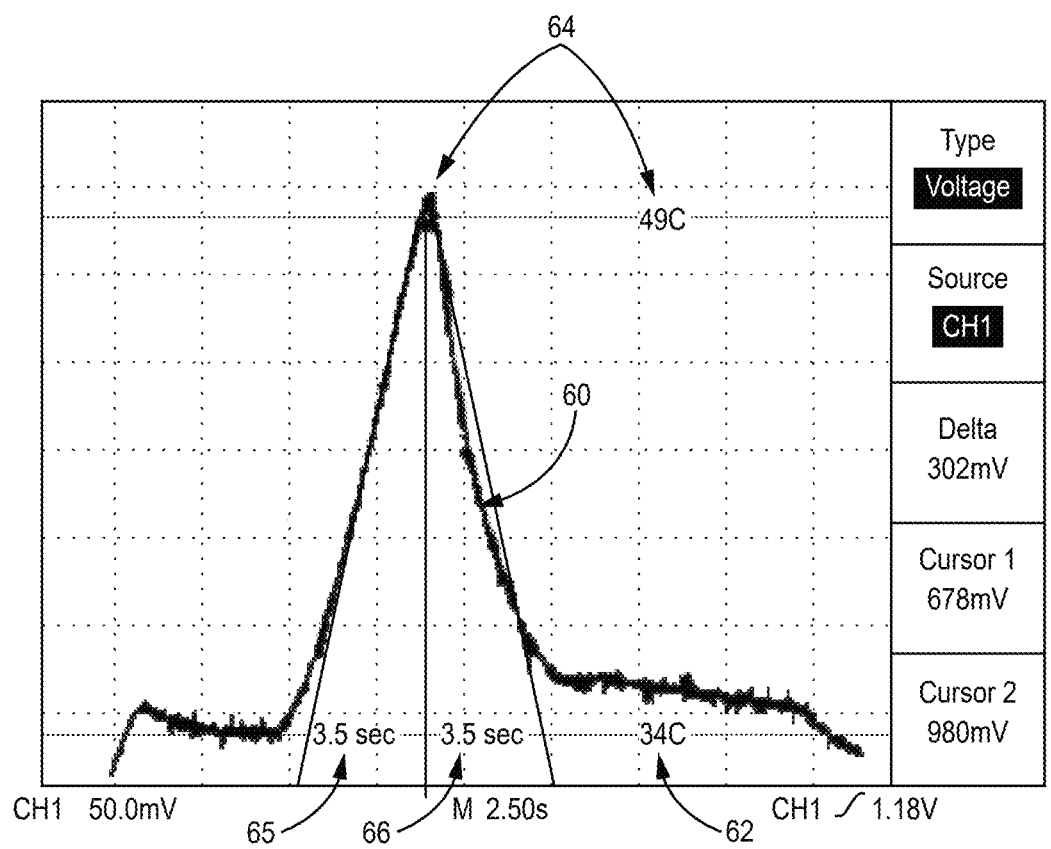
FIG. 3 is a timing plot of a thermal stimulus waveform that may be delivered to a patient by a heat stimulation device in accordance with embodiments of this disclosure.

FIG. 3 shows the temperature of an exemplary thermal stimulus waveform 60 rising steadily to a peak temperature 64 over a time period of approximately 3.5 seconds (rise time 65) in the example shown. Upon reaching peak temperature 64, the temperature of the thermal stimulus waveform 60 decreases in a mostly linear manner back to near the baseline temperature 62 over a similar time period of approximately 3.5 seconds (fall time 66) in the example of FIG. 3. The rise time 65 and fall time 66 values need not be equal and may be chosen to have different values according to alternate embodiments, or to comply with and/or approximate certain testing criteria. The relatively sharp rise and subsequent sharp fall in temperature provided by the thermal stimulus waveform 60 may be chosen for assessing a patient's perception of pain, since it may approximate or simulate the sensation or pain associated with a pin prick, for example. The "shape" of the thermal stimulus waveform 60 may be chosen to provide a relatively precise or defined thermal stimulus (pain stimulus) to a patient for the purposes of assessing a patient's perception of pain. In some embodiments of this disclosure, a number of predefined stimulation waveforms 60 may be available from the device 10 to deliver to a patient. Having a plurality of thermal stimuli (e.g., provided by the plurality of predefined stimulation waveforms 60) that correspond to a range of varying thermal stimuli may provide a scale by which the patient's perception of pain can be assessed or compared. The shape of each of the plurality of stimulation waveforms 60 could, for example, differ by varying one or more of their respective peak temperature 64 values and/or baseline temperature 62 values, or by changing the duration of the rise time 65 and/or fall time 66 to reach a given peak temperature 64 and return to a given baseline temperature 62, respectively, for example. Those of ordinary skill in the art would be able to further modify the shape of the stimulation waveform if and as desired with the benefit of these teachings.

In some embodiments, thermal stimulus waveform 60 may be generated using an electrical circuit to control the amount of electrical current and/or the direction of the current flow through TEU 22 to produce the desired temperature output at the first surface of TEU 22 corresponding to the thermal stimulus waveform 60. Such a circuit may, for example, comprise a feedback loop designed to (a) sense a temperature corresponding to the temperature at the first surface of TEU 22, (b) compare the sensed temperature to a desired temperature corresponding to the thermal stimulus waveform 60, and (c) vary the electrical current (e.g., current direction and/or amplitude) delivered to TEU 22 in order to follow or match the desired temperature profile (as a function of time) of the thermal stimulus waveform 60. In some embodiments, the sensed temperature corresponding to the temperature at the first surface of TEU 22 may actually be a temperature signal measured at the second side of TEU 22 (e.g., opposite to the first side of TEU 22). This may, for example, provide a more stable temperature signal that is less prone to fluctuations and/or noise.

Figure 6A:
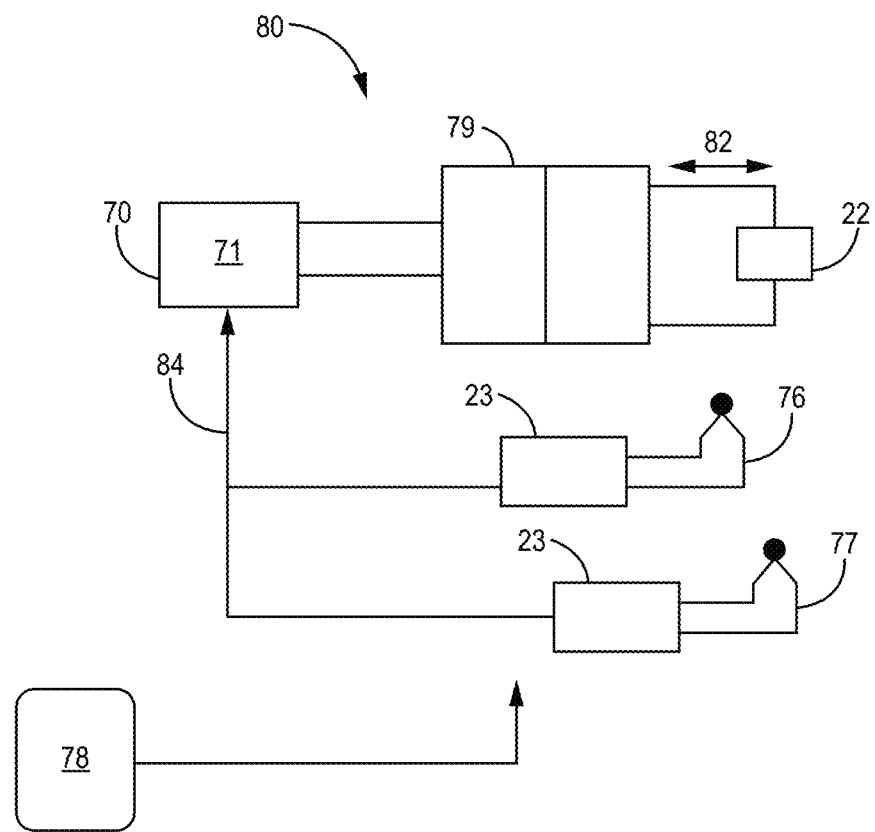
FIG. 6A is a high-level circuit diagram showing control circuitry for generating a thermal stimulus waveform according to some embodiments of this disclosure.

In some embodiments, a processor may be employed as a portion of such a control circuit. FIG. 6A shows an exemplary circuit 80 that may be used to generate one or more thermal stimulus waveforms 60 in conjunction with assessing a patient's perception of pain. In some embodiments, the components of circuit 80 may be housed within housing portion 50 of device 10, for example. FIG. 6A includes a processor 70, which is configured to receive power from a source of electrical power 78 (e.g., a battery, possibly a rechargeable battery in some embodiments), and which is further configured to access and/or store executable instructions 71 corresponding to one or more thermal stimulus waveforms 60. Processor 70 is configured to control the electrical current signal 82 delivered to TEU 22 in order to generate one or more of the thermal stimulus waveforms 60 corresponding to the stored executable instructions 71.

Processor 70 may, in some embodiments, use a sensed temperature signal 84 received from a temperature sensor 23 (e.g., a thermocouple or thermistor), in a feedback control loop to produce a desired thermal stimulus. For example, processor 70 may be configured to receive a sensed temperature signal 84 corresponding to the temperature at the first side 76 (e.g., a patient-facing side) of TEU 22 as the feedback control signal, and to compare the sensed temperature signal 84 to the temperature of the thermal stimulus waveform 60 as it varies over time, and to then vary the electrical current signal 82 in order to follow and/or match the thermal stimulus waveform 60. Alternately, processor 70 may be configured to receive a sensed temperature signal 84 corresponding to the temperature at the second side 77 (e.g., the opposite or non-patient side) of TEU 22 as the feedback control signal. Processor 70 may comprise, for example, a proportional-integral-derivative ("PID") controller that uses a sensed temperature signal received from a temperature sensor 23 to produce the thermal stimulus. In some embodiments, the sensed temperature signal may be generated by a thermocouple 23 disposed and configured to sense a temperature of the second side of TEU 22. In some embodiments, processor 70 causes the electrical current signal 82 to be delivered to the TEU 22 to cause the thermal stimulus to be delivered to a skin surface of a patient, the thermal stimulus comprising a rapidly increasing temperature portion followed by a rapidly decreasing temperature portion.

In some embodiments, device 10 may comprise a switching circuit configured to deliver the electrical current signal from the source of electrical power 78 to the TEU 22, wherein the processor 70 causes the switching circuit to vary the electrical current signal to produce the thermal stimulus. In the embodiment shown in FIGS. 6A and 6B, for example, the switching circuit may comprise an "H-bridge" control circuit 79, which may be used in conjunction with control circuit 80 to produce the thermal stimulus waveform 60. For example, in FIG. 6B, an exemplary H-bridge circuit 79 is shown as it may be used to form part of control circuit 80. In this embodiment, processor 70 causes H-bridge circuit 79 to vary the electrical current signal 82 delivered to TEU 22 in response to the sensed temperature signal 84 received from temperature sensor 23, which could be a thermocouple or thermistor, according to various embodiments. Varying the electrical current signal 82 may comprise, for example, reversing a direction of the electrical current signal 82 through the TEU 22 via the H-bridge circuit 79. H-bridge circuits have typically been used for controlling certain types of electrical motors where rapid switching of current direction may be desired. H-bridge circuit 79 is designed to quickly and repeatedly (as necessary) reverse the direction of the electrical current signal 82 that flows through TEU 22 in order to achieve the one or more thermal stimulus waveforms 60, including the rapidly increasing (and rapidly decreasing) temperature profile shown in FIG. 3. The shape of the thermal stimulus waveforms 60 described with respect to FIG. 3 may allow the thermal stimulus delivered to the patient to more closely approximate the pin prick sensation desired to elicit the desired pain perception response from a patient.

Figure 6B:
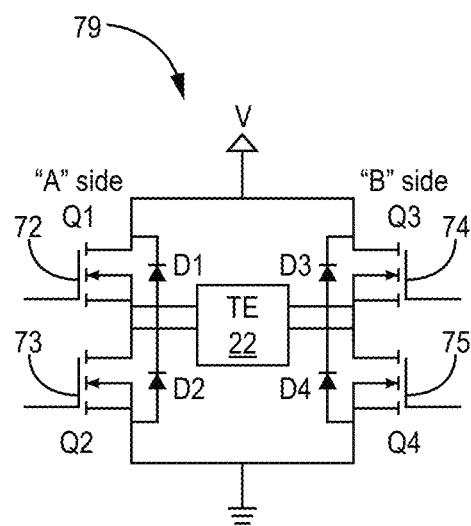
FIG. 6B is an exemplary circuit diagram illustrating an "H-bridge" circuit which may be used for generating a thermal stimulus waveform according to some embodiments of this disclosure.

FIG. 6B shows certain components of an exemplary H-bridge circuit 79, which enable it to provide the ability to rapidly switch current direction, as desired. For example, H-bridge circuit 79 includes four pairs of diodes and transistors (labeled D1, Q1, etc.) positioned in an "H" pattern around a current load (typically a motor, but in this application, a TEU such as TEU 22). Based on control signals from processor 70, transistors Q1 (element 72) through Q4 (element 75) may be selectively turned "on" or "off" to allow current to flow (ON) or to block current flow (OFF). In the H-bridge application, transistors 72 and 75 are synchronized to both be either ON or OFF, and similarly, transistors 73 and 74 are synchronized to both be either ON or OFF, but transistors 72 and 75 are always opposite to transistors 73 and 74. Thus, in one state, the electrical current signal 82 flows only through transistors 72 and 75 in a first direction through TEU 22, and in the other state, the electrical current signal 82 flows only through transistors 73 and 74 in a second direction through TEU 22 that is opposite the first direction.

Figure 1E:
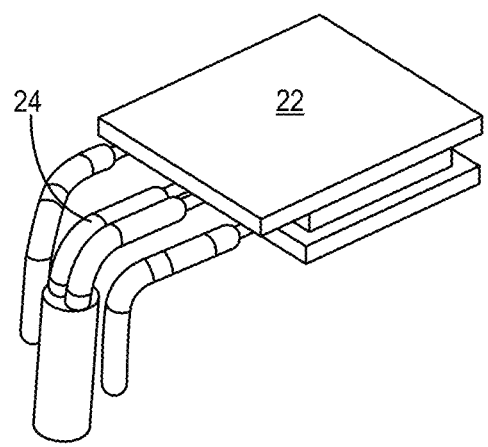
Figure 2A:
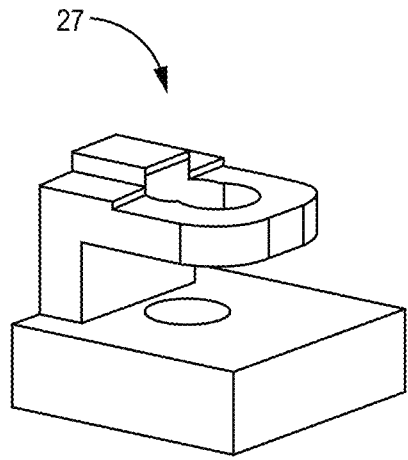
FIGS. 2A-2C are perspective views of elements of the stimulus portion of the heat stimulation device in accordance with some embodiments of this disclosure.
Figure 2B:
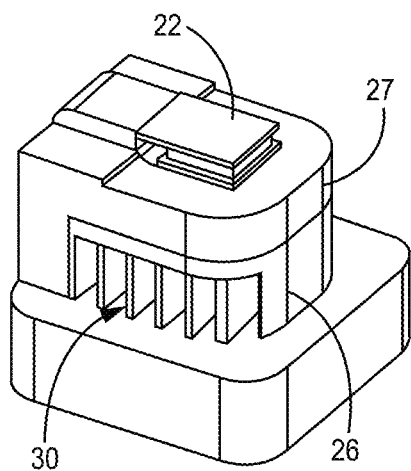
Figure 2C:
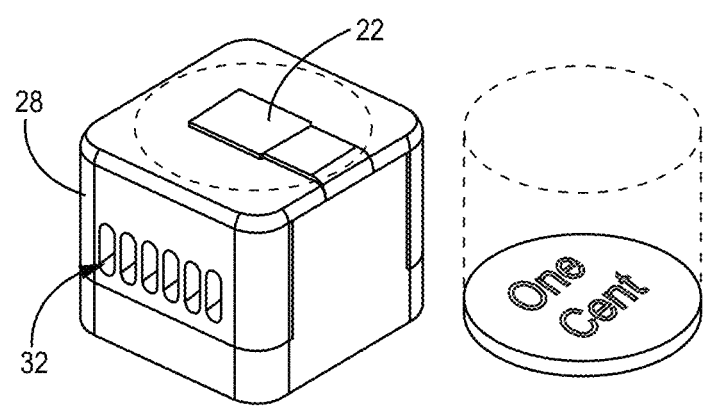

FIGS. 2A-2C are perspective views of portions of the stimulus portion 20 of the heat stimulation device 10 of FIG. 1. For example, FIGS. 2A and 2B show an exemplary support structure 27 for positioning and arranging the TEU 22, the copper heat sink 25, and the aluminum heat sink 26 (showing exemplary cooling fins 30) within the stimulus portion 20 of the heat stimulation device 10. FIG. 2C shows an exemplary cover assembly 28 for the stimulus portion 20 according to a particular embodiment. FIG. 2C also presents an approximation of the size of the stimulus portion 20 of the heat stimulation device 10 achievable in accordance with some embodiments relative to the size of an ordinary coin. As shown in the exemplary configuration of FIG. 2C, the surface area of the exposed first side of TEU 22 is less than the surface are of a side of an ordinary penny.

The small size of TEU 22 for use with device 10 may be enabled, at least partly, due to the arrangement, sizing, and materials chosen for the other components (including copper heat sink 25 and aluminum heat sink 26) and/or the nature of the thermal stimulus waveform 60 delivered by device 10. In some embodiments, the copper heat sink 25 has a first side held in thermal contact with the second side of TEU 22, and a second side having a copper surface area which is, in turn, placed in thermal contact with a first side of aluminum heat sink 26. The first side of aluminum heat sink 26 may have an aluminum surface area that is larger than the copper surface area according to some embodiments. In some embodiments, the aluminum surface area is at least twice as large as the copper surface area. In some embodiment, the aluminum heat sink 26 may be generally rectangular in shape. In embodiments where aluminum heat sink 26 is generally rectangular (e.g., including wherein the aluminum surface area is generally rectangular), a length of the cooling fins that extends away from the rectangular surface area is less than a length of at least one side of the generally rectangular aluminum surface area. In certain embodiments, a length of the cooling fins that extends away from the rectangular surface area is less than a length of both sides of the generally rectangular aluminum surface area.

Support structure 27 may be comprised of aluminum, in some embodiments. As shown in FIGS. 2A and 2B, support structure 27 may be configured and shaped to enable placement and support of TEU 22, copper heat sink 25, and aluminum heat sink 26 in a "stacked" arrangement to thereby enhance the thermal conductivity therebetween (and accordingly, the heat dissipation capabilities thereof). The cooling fins 30 of aluminum heat sink 26, as shown in FIG. 2B, are formed to help direct air flow away from the aluminum heat sink 26, through the air flow holes 32 formed in the cover assembly 28 during operation. The overall structure of the heat sink 25, 26 may facilitate heat transfer to static air in or around the stimulus portion 20 without necessitating a flow of a cooling fluid (e.g., circulating water flow or forced air from fans) or other comparable, bulky cooling apparatus to accomplish the desired level of heat transfer.

A heat stimulation device 10 in accordance with some embodiments of this disclosure may have the ability to deliver a plurality of discrete thermal stimuli corresponding to different heat stimulation levels and/or pain perception levels. In some embodiments, the plurality of thermal stimuli may comprise at least two thermal stimuli, each of the thermal stimuli corresponding to a different pain perception level. In some embodiments, as many as 10 or 20 discrete thermal stimuli levels may be deliverable from the device 10 to a patient. In one embodiment, 12 discrete thermal stimuli levels may be used to assess and/or quantify differing levels of heat or pain perception by a patient test subject. In some embodiments of this disclosure, each successive heat stimulation level is chosen in an attempt to differ from the adjacent levels of heat stimulation by an amount that is just enough to be perceptible or noticeable by a typical patient. These gradations in stimulation levels are sometimes referred to as "just noticeable differences," or JNDs. Thus, in one example, the twelve thermal stimuli provided by device 10 may present twelve pain perception levels to a patient corresponding to a scale of 12 JNDs in a patient's perception of pain. In some embodiments, one or more of the plurality of thermal stimuli may be delivered to a skin surface of a patient to determine, for example, the patient's minimum threshold to detect heat, and/or to determine the patient's maximum endurable thermal stimulus. In some embodiments, each one of the plurality of thermal stimuli may be distinct from the others based on differences in one or more of the following parameters of the thermal stimuli: the baseline temperature, the peak temperature, the rise time, the fall time, and the hold time, etc.

In some embodiments, the heat stimulation device 10 is configured to automatically select a particular thermal stimulus from the plurality of thermal stimuli to be delivered to the patient by the device 10. In other embodiments, the heat stimulation device 10 is configured to allow an operator of the device 10 to select the particular thermal stimulus from the plurality of thermal stimuli to be delivered to the patient.

In some embodiments, the heat stimulation device 10 is able to deliver a number of discrete heat stimuli at a range of temperatures. In some embodiments, the temperature range may span a range of temperatures from less than about 30° C. to more than about 50° C. In some particular embodiments, a smaller range, such as 34° C. to about 49° C. may be used. Particular temperatures employed may include 34° C., 41.875° C., 44.5° C., and 48° C. according to one particular embodiment, for example.

In some embodiments, the heat stimulation device 10 may include a processor 70 configured (e.g., programmed) to take a corrective action in response to the sensed temperature signal 84 received from the temperature sensor 23 exceeding a predetermined safety condition. In some exemplary embodiments, the corrective action may comprise disabling the hand-held device 10, or activating an audible alarm, or initiating a rapid cool-down function, or a combination of such actions, for example. In some embodiments, the predetermined safety condition may include temperature signal 84 exceeding a predefined temperature setting. In other embodiments, the predetermined safety condition may include reaching or exceeding a predefined rate of temperature increase.

The stimulation surface area (e.g., the surface area of surface TEU A1) of a heat stimulation device 10 is relatively small. In some embodiments, the surface area may be less than 1 sq. cm, and in certain embodiments, may be less than 0.5 sq. cm.

In various embodiments, a heat stimulation device 10 according to this disclosure may be configured to house a rechargeable battery. In various embodiments, a heat stimulation device 10 according to this disclosure may be configured to house control circuitry and/or communication circuitry, for example, the aforementioned H-Bridge circuitry for controlling the input signals to the surface TEU A1. In some embodiments, a rechargeable battery and/or communications and control circuitry may be housed within a housing portion 50 of the heat stimulation device 10 shown in FIG. 1.

Figure 5:
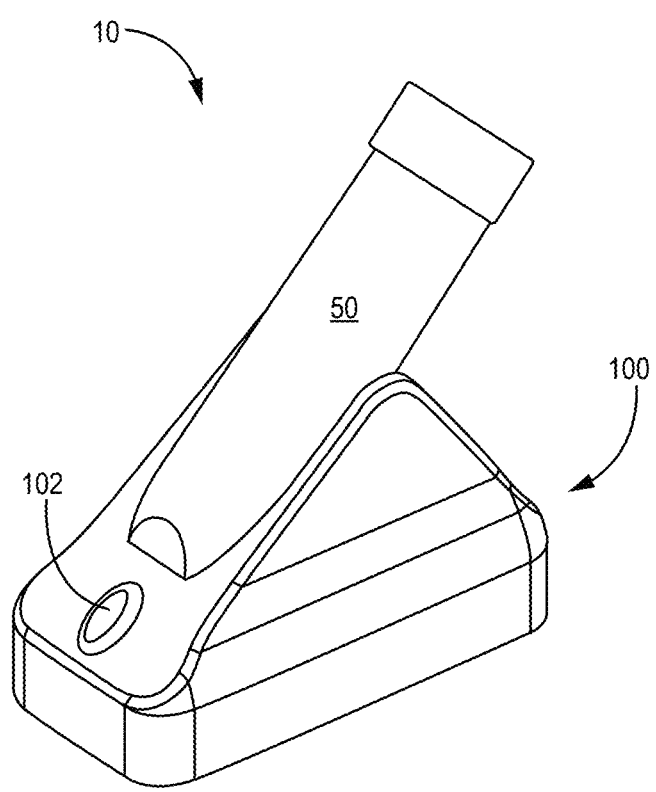
FIG. 5 is a perspective view of a heat stimulation device coupled to a docking station, for example during a battery recharging process, according to some embodiments of this disclosure.

FIG. 5 shows an embodiment of a heat stimulation device 10 configured to rest and/or operably couple (engage) to a charging stand or docking station 100, as shown. In embodiments of device 10 having a source of electrical power that is rechargeable (e.g., a rechargeable battery, for example), a portion of device 10 may seat within a docking station 100, which may be configured to re-charge the source of electrical power or rechargeable battery of device 10. Docking station 100 may, for example, plug into an AC outlet to receive power from a typical electrical outlet, and convert AC power into an appropriate charging signal to recharge the rechargeable battery. In the embodiment depicted in FIG. 5, the stimulus portion 20 may be placed in contact with docking station 100 to establish electrical contact for recharging operations. Alternately, housing portion 50 could be seated in docking station 100 to establish electrical contact for recharging operations. FIG. 5 also shows an indicator light and/or button 102 that could be used to indicate the status of charging (e.g., orange light while charging, green light when fully charged), or to initiate some other feature.

In some embodiments, docking station 100 may also incorporate a self-check feature to monitor the performance and/or safety of the heat stimulation device 10, e.g., for accuracy and safety reasons. In some embodiments, a sensing apparatus may be housed within docking station 100 to perform an assessment of the stimulus portion 20 of the hand-held device 10 when it is operably coupled to the docking station 100. Button 102 of docking station 100 could, for example, be used to initiate such an assessment. For example, upon press of button 102, docking station 100 and device 10 may communicate and/or cooperate to perform the assessment. In some embodiments, the assessment may involve device 10 generating a known thermal stimulus at stimulus portion 20 and docking station 100 being configured to sense and evaluate the thermal stimulus and provide an indication of the functionality to an operator.

In some embodiments, a self-check or self-monitoring function may be employed to analyze for the presence of problems or issues, such as "hot spots" in the stimulus portion 20 of device 10 that may pose a risk of harm to a patient if left undetected. For example, a diagnostic test could be performed where the device looks for a temperature difference or "spread" across the heat stimulation surface that exceeds a predetermined threshold level that may be indicative of a problem or of a future problem or failure. This type of diagnostic self-test could take place at any time, or upon initiation by a user (e.g., upon pressing of a button 102), or it may be setup to automatically be performed during recharging of the power supply of the device 10 while engaged with docking station 100, for example. An alert or alarm may be used to indicate a potential failure or hazard to a user based on the results of such tests.

In some embodiments, the assessment of the stimulus portion 20 may include generating a thermal test signal by the stimulus portion 20 of the hand-held device 10. This test signal may be the same as one the available thermal stimulus waveforms 60, or it may be a particular thermal test signal unique to the self-check or assessment. The assessment may further include the docking station 100 sensing a plurality of temperatures across a surface of the stimulus portion 20 and indicating whether an unsafe condition exists based on the plurality of sensed temperatures. The indication of whether or not there exists an unsafe condition may be presented by either the docking station 100 or the hand-held device 10. The determination of whether an unsafe condition exists may be based on the plurality of sensed temperatures across the surface of the stimulus portion 20 meeting one or more predefined criteria. For example, one criterion for an unsafe condition may be the detection of a maximum temperature among the plurality of sensed temperatures that exceeds a threshold temperature. In some embodiments, a criterion for an unsafe condition may be the detection of a maximum temperature among the plurality of sensed temperatures that exceeds the average temperature of the plurality of sensed temperatures by a threshold amount. In further embodiments, a criterion for an unsafe condition may be the detection of a maximum temperature among the plurality of sensed temperatures that exceeds the minimum temperature of the plurality of sensed temperatures by a threshold amount. A combination of the above criteria and variations thereof would be contemplated by those of ordinary skill and would be deemed to be within the scope of this disclosure.

In some embodiments, docking station 100 may include an array of temperature sensors configured to be in proximity to the stimulus portion 20 when the hand-held device 10 is operably coupled to the docking station 100. In further embodiments, the array of temperature sensors may be in proximity to the first side of TEU 22 of the stimulus portion 20 when the hand-held device 10 is operably coupled to the docking station 100. In some embodiments, the array of temperature sensors may include one or more optical sensors, for example.

In some embodiments, docking station 100 may further comprise one or more LEDs configured to generate and emit UV-C light energy, and to expose the stimulus portion 20 of the hand-held device 10 to UV-C light energy to thereby disinfect or sterilize the stimulus portion 20 when the hand-held device 10 is operably coupled to the docking station 100.

In various embodiments, a heat stimulation device 10 according to this disclosure may be configured to communicate wirelessly with other devices, for example, via Bluetooth or other wireless technologies as are known.

Various examples have been described. These and other variations that would be apparent to those of ordinary skill in this field are within the scope of this disclosure.

What is claimed is:

1. A hand-held device for assessing a patient's perception of pain, the device comprising:
    a housing portion configured to be held in a user's hand; and
    a stimulus portion coupled to the housing portion, the stimulus portion configured to deliver a thermal stimulus to a skin surface of a patient, the stimulus portion comprising:
        a thermoelectric unit ("TEU") having a first side and a second side, the TEU configured to receive an electrical current signal and to vary a temperature of the first side of the TEU in response to the received electrical current signal, the first side of the TEU being configured to be placed in proximity to the skin surface of the patient to deliver the thermal stimulus;
        a temperature sensor disposed in proximity to one of the first side and the second side of the TEU and configured to generate a sensed temperature signal;
        a heat sink comprising a first material and a second material, a first side of the first material in thermal contact with the second side of the TEU, a second side of the first material in thermal contact with a first side of the second material, the first material of the heat sink comprising copper forming a copper heat sink, the second material of the heat sink comprising aluminum forming an aluminum heat sink, the second side of the copper heat sink having a copper surface area, the first side of the aluminum heat sink having an aluminum surface area that is larger than the copper surface area, and wherein the heat sink does not comprise a flow of a cooling fluid;
    the housing portion comprising:
        a source of electrical power;
        a switching circuit configured to deliver the electrical current signal from the source of electrical power to the TEU; and
        a processor, the processor configured to:
            receive electrical power from the source of electrical power;
            receive the sensed temperature signal from the temperature sensor; and
            cause the electrical current signal to be delivered to the TEU to cause the thermal stimulus to be delivered to the skin surface of the patient, the processor causing the switching circuit to vary the electrical current signal to produce the thermal stimulus, the thermal stimulus comprising a rapidly increasing temperature portion followed by a rapidly decreasing temperature portion.

2. The hand-held device of claim 1 wherein the second side of the second material comprises a plurality of cooling fins.

3. The hand-held device of claim 1 wherein the switching circuit comprises an H-bridge circuit.

4. The hand-held device of claim 3 wherein the processor is configured to cause the H-bridge circuit to vary the electrical current signal delivered to the TEU in response to the sensed temperature signal received from the temperature sensor.

5. The hand-held device of claim 4 wherein the processor is configured to cause the H-bridge circuit to vary the electrical current signal by reversing a current direction through the TEU via the H-bridge circuit.

6. The hand-held device of claim 4 wherein the processor is configured to use the sensed temperature signal received from the temperature sensor in a feedback control loop to produce the thermal stimulus.

7. The hand-held device of claim 6 wherein the processor comprises a proportional-integral-derivative ("PID") controller that is configured to use the sensed temperature signal received from the temperature sensor to produce the thermal stimulus.

8. The hand-held device of claim 1 wherein the processor is configured to cause the electrical current signal to be delivered to the TEU to increase the temperature of the first side of the TEU and decrease a temperature of the second side of the TEU in response to receiving the electrical current signal having a first polarity, and wherein the processor is configured to cause the electrical current signal to be delivered to the TEU to decrease the temperature of the first side of the TEU and increase the temperature of the second side of the TEU in response to receiving the electrical current signal having a second polarity opposite to the first polarity.

9. The hand-held device of claim 8 wherein the TEU is a Peltier effect TEU.

10. The hand-held device of claim 1 wherein the thermal stimulus to be delivered to the patient is selected by an operator of the hand-held device from a plurality of thermal stimuli.

11. The hand-held device of claim 1 wherein the thermal stimulus to be delivered to the patient is selected automatically by the hand-held device from a plurality of thermal stimuli.

12. The hand-held device of claim 1 wherein the thermal stimulus is selected from a plurality of thermal stimuli, and wherein each one of the plurality of thermal stimuli is distinct from at least one other of the plurality of thermal stimuli based on one or more of a baseline temperature, a peak temperature, a rise time, a fall time, and a hold time.

13. The hand-held device of claim 12 wherein the plurality of thermal stimuli comprises at least two thermal stimuli, each of the at least two thermal stimuli corresponding to a different pain perception level.

14. The hand-held device of claim 13 wherein the pain perception levels correspond to a scale of just noticeable differences ("JNDs") in the patient's perception of pain.

15. The hand-held device of claim 14 wherein one or more of the plurality of thermal stimuli are delivered to the skin surface of the patient to determine one or more of a minimum threshold to detect heat and a maximum endurable thermal stimulus.

16. The hand-held device of claim 1 wherein the temperature sensor is a thermocouple or a thermistor configured to generate the sensed temperature signal based on the temperature of the first side of the TEU.

17. The hand-held device of claim 16 wherein the temperature sensor is connected to a bottom of the first side of the TEU.

18. The hand-held device of claim 1 wherein the first material has a different coefficient of thermal conductivity than the second material.

19. The hand-held device of claim 1 wherein the aluminum surface area is at least twice as large as the copper surface area.

20. The hand-held device of claim 2 wherein the aluminum surface area is generally rectangular, and wherein a length of the cooling fins is less than a length of at least one side of the generally rectangular aluminum surface area.

21. The hand-held device of claim 1 wherein the hand-held device is configured to operably couple to a docking station to recharge the source of electrical power.

22. The hand-held device of claim 21 wherein the source of electrical power comprises a rechargeable battery configured to be recharged when the hand-held device is operably coupled to the docking station.

23. The hand-held device of claim 1 wherein the hand-held device is further configured to receive an input corresponding to a response of the patient to the thermal stimulus.

24. The hand-held device of claim 23 wherein the input corresponding to a response of the patient to the thermal stimulus is provided by the patient via a separate device configured to communicate wirelessly with one of the hand-held device and a docking station.

25. The hand-held device of claim 1, wherein the housing portion further comprises a display for displaying a result relating to the patient's perception of pain.

26. The hand-held device of claim 1 wherein the processor is programmed to take a corrective action in response to the sensed temperature signal received from the temperature sensor exceeding a predetermined safety condition.

27. The hand-held device of claim 26 wherein the corrective action comprises disabling the hand-held device.

28. The hand-held device of claim 26 wherein the predetermined safety condition comprises a predefined temperature setting.

29. The hand-held device of claim 26 wherein the predetermined safety condition comprises a predefined rate of temperature increase.

30. A hand-held device for assessing a patient's perception of pain, the device comprising:
 a housing portion configured to be held in a user's hand; and
 a stimulus portion coupled to the housing portion, the stimulus portion configured to deliver a thermal stimulus to a skin surface of a patient, the stimulus portion comprising:
  a thermoelectric unit ("TEU") having a first side and a second side, the TEU configured to receive an electrical current signal and to vary a temperature of the first side of the TEU in response to the received electrical current signal, the first side of the TEU being configured to be placed in proximity to the skin surface of the patient to deliver the thermal stimulus;
  a temperature sensor disposed in proximity to one of the first side and the second side of the TEU and configured to generate a sensed temperature signal; and
  a heat sink comprising a first material, a first side of the first material in thermal contact with the second side of the TEU, wherein the heat sink does not comprise a flow of a cooling fluid;
 the housing portion comprising:
  a source of electrical power;
  a switching circuit configured to deliver the electrical current signal from the source of electrical power to the TEU; and
  a processor, the processor configured to:
   receive electrical power from the source of electrical power;
   receive the sensed temperature signal from the temperature sensor; and
   cause the electrical current signal to be delivered to the TEU to cause the thermal stimulus to be delivered to the skin surface of the patient, the processor causing the switching circuit to vary the electrical current signal to produce the thermal stimulus, the thermal stimulus comprising a rapidly increasing temperature portion followed by a rapidly decreasing temperature portion,
 wherein the hand-held device is configured to operably couple to a docking station to perform an assessment of the stimulus portion of the hand-held device.

31. The hand-held device of claim 30 wherein the docking station is configured to perform the assessment of the stimulus portion, the docking station being configured to:
 cause a thermal test signal to be generated by the stimulus portion of the hand-held device;
 sense a plurality of temperatures across a surface of the stimulus portion; and
 indicate an unsafe condition based on the plurality of sensed temperatures across the surface of the stimulus portion meeting at least one predefined criterion.

32. The hand-held device of claim 31 wherein the at least one predefined criterion comprises a maximum of the plurality of sensed temperatures exceeding a threshold temperature.

33. The hand-held device of claim 31 wherein the at least one predefined criterion comprises a maximum of the plurality of sensed temperatures exceeding an average of the plurality of sensed temperatures by a threshold amount.

34. The hand-held device of claim 31 wherein the at least one predefined criterion comprises a maximum of the plurality of sensed temperatures exceeding a minimum of the plurality of sensed temperatures by a threshold amount.

35. The hand-held device of claim 31 wherein the docking station comprises an array of temperature sensors configured to be in proximity to the stimulus portion when the hand-held device is operably coupled to the docking station.

36. The hand-held device of claim 35 wherein the array of temperature sensors is configured to be in proximity to the first side of the TEU of the stimulus portion when the hand-held device is operably coupled to the docking station.

37. The hand-held device of claim 35 wherein the array of temperature sensors comprises one or more optical sensors.

38. The hand-held device of claim 30 wherein the docking station further comprises one or more LEDs configured to expose the stimulus portion of the hand-held device to UV-C light energy to disinfect the stimulus portion when the hand-held device is operably coupled to the docking station.

* * * * *